United States Patent [19]

Gershkovich et al.

[11] Patent Number: 5,448,620
[45] Date of Patent: Sep. 5, 1995

[54] VOLUME CONTROL FOR A DUAL MODE COMMUNICATIONS DEVICE

[75] Inventors: Izidor Gershkovich, Hod Masharon; Gil Rapoport, Tel Aviv; Eytan Ramon, Givat Shmuel; Gadi Shirazi, Ramat Gan; Zalman Schwartzman, Rehovet; Aharon Kashtan, Herzlia, all of Israel

[73] Assignee: Motorola, Inc., Schaumburg, Ill.

[21] Appl. No.: 86,475

[22] Filed: Jul. 1, 1993

[30] Foreign Application Priority Data

Jul. 2, 1992 [GB] United Kingdom .................. 9214180
May 21, 1993 [GB] United Kingdom .................. 9310640

[51] Int. Cl.⁶ ........................ H04Q 7/22; H04M 11/00
[52] U.S. Cl. ....................................... 379/58; 379/390; 455/219; 455/234.1; 455/234.2; 381/107
[58] Field of Search ................ 455/74, 89, 200.1, 219, 455/234.1, 234.2, 90, 142; 381/107, 72; 379/58, 390, 59

[56] References Cited

U.S. PATENT DOCUMENTS

| | | | |
|---|---|---|---|
| 4,718,110 | 1/1988 | Schaefer | 455/90 |
| 4,829,565 | 5/1989 | Goldberg | 381/107 |
| 5,081,407 | 1/1992 | Schorman et al. | 381/107 |
| 5,130,665 | 7/1992 | Walden | 381/107 |
| 5,172,408 | 12/1992 | Petty et al. | 379/390 |
| 5,175,872 | 12/1992 | Borras | 455/89 |
| 5,189,705 | 2/1993 | Lavaud | 381/107 |
| 5,265,264 | 11/1993 | Dzung et al. | 455/90 |

Primary Examiner—Curtis Kuntz
Assistant Examiner—William Trost
Attorney, Agent, or Firm—Frank M. Scutch, III

[57] ABSTRACT

FIGS. 2 and 3 illustrate communications devices (30) that are operable in both a radio dispatch mode and a telephone interconnect mode. To mitigate the problem of a relatively high level audio signal from being unexpected broadcast from an ear-piece of the device (30) when the ear-piece is proximally located with an ear of a user of the device, the communications device (30) is arranged to ensure that, at least during an initial period of operation in either of the two operating modes, audio signals of relatively high level do not originate from the ear-piece, thereby preventing a change in audio power output from the ear-piece that may potentially cause damage to the hearing of a user of the radio communications device.

47 Claims, 4 Drawing Sheets

VOLUME CONTROL FOR A DUAL MODE COMMUNICATIONS DEVICE

BACKGROUND TO THE INVENTION

This invention relates, in general, to communications devices and is particularly, but not exclusively, applicable to hand-held portable radio communications devices having a speaker/microphone combination, and the operation of the combination to provide dispatch, trunking and telephone interconnect facilities therein.

SUMMARY OF THE PRIOR ART

Typically, portable full-duplex radio equipment is packaged into a unit that replicates the features of a conventional telephone handset. The portable full-duplex unit typically comprises a built-in ear-piece and a separate built-in microphone. The ear-piece and microphone are located such that when the portable unit is used as a telephone handset, the ear piece is located in close proximity to a user's ear whilst the microphone is located in close proximity to the user's mouth.

When the portable unit is in a standby mode of a telephone interconnect-type full-duplex system, the unit is typically held in either a specially designed holster or base unit or in the hand of a user. A hook switch, located on the base unit is depressed by the pressure of the unit thereon and, as a consequence thereof, activates a loud speaker mounted on a side of the base unit. When a call is directed towards a particular unit, that portable unit attracts the attention of the user by issuing a call received tone through the loud speaker. In response to such a tone, the user activates an answer button on the portable unit and then correctly orientates the portable unit towards their head in order to facilitate a telephone conversation. Furthermore, the release of the hook switch deactivates the loud speaker and enables the ear-piece. Alternatively, if a user initiates a call, the user dials the required number and then correctly orientates the unit such that the ear piece is in close proximity to one of their ears. The user will then be able to identify when the call has been answered. It will be appreciated that during typical operation of a full-duplex telephone interconnect system, a received message is usually routed to an ear-piece so as to ensure adequate acoustic reception by the human ear at a sufficiently low sound pressure. If the portable unit is hand held, announciation of an incoming call is made through the ear-piece.

In dispatch mode type operation, a dispatch unit will either be held in a specially designed holster or in the hand of a user. A relatively high powered speaker (1-2 watts) is internally mounted on the dispatch unit such that a received message is broadcast at a sufficiently high enough audio level therefrom. The audio level must be such that the broadcast is legibly detectable by a user even when the dispatch unit is remotely located in the holster. Typically, there are ten or more users who share the same talk group in a two-way dispatch communications system. A user only has to respond if his name or call sign has been broadcast through the speaker. Clearly, most of the messages received by a portable two-way dispatch communications unit are not directed to a particular user and will normally be ignored. However, when the user is addressed, the user instantly places the dispatch unit in front of his mouth whilst activating a push to talk (PTT) button. Furthermore, the user will wait for further messages to be broadcast through the speaker whilst the dispatch unit is located in front of the user's face.

However, there is a growing demand to combine dispatch type two-way communication together with full-duplex telephone interconnect type operation in a single portable unit. Unfortunately, design difficulties arise from the inherent differences between dispatch type and full-duplex type communication.

In order to combine both dispatch and telephone interconnect modes in one portable unit, it is necessary to design a unit which supports the different acoustic and operational requirements therefor. A solution to this problem is to substitute a loud speaker for the ear-piece, and then regulate the audio power output from the speaker during the dispatch and interconnect operating modes. Specifically, full audio power would be administered during dispatch operation whilst reduced audio power would be administered during telephone interconnect operation. Unfortunately, this approach does not mitigate the potentially hazardous condition arising from a user holding the unit is in close proximity to their ear and simultaneously receiving a dispatch call therefrom. The relatively high acoustic pressure of the dispatch mode, corresponding to a 1-2 watt audio drive, is an unpleasant experience and can cause temporary or permanent hearing damage. From a statistical view-point, the foregoing scenario would occur far too frequently in a communications device exhibiting a telephone handset design. Moreover, the occurrence of this scenario might also contravene pertinent health and safety regulations.

In addressing the problem by providing a buzzer alert in combination with a low speaker level for default operation, further difficulties arise in that a user cannot immediately identify who has paged him and may, additionally, fail to respond to a call. Furthermore, if a caller directs a message to the user in a format wherein the caller only identifies a user after the message has been relayed, emphasis of the message is lost since the message is not directed at a particular individual or group.

Present techniques attempt to overcome the inherent problems associated with dual dispatch and radio interconnect operation by providing a communications device with a sliding or hinged mouth-piece. When the mouth-piece is extended, the device operates in a radio interconnect mode, and when the mouth-piece is closed, the device operates in a dispatch mode. Consequentially, the audio output of the device is automatically controlled according to the position of the mouth-piece. However, this well known approach has certain drawbacks. Specifically, the space provided for electronic circuitry and batteries is reduced, with the result that substantial constraints are imposed on the mechanical design thereof.

It can be appreciated that there is a requirement within the art for a combined full-duplex/half-duplex portable radio. Moreover, such a combination radio must address the inherent differences in paging methodologies thereof and thereby prevent the possibility of damage to a user's ear from excessive audio levels emanating from a speaker thereof, or the possibility of not alerting the user by not generating a sufficient audio level during signalling. Furthermore, it is desirable to retain a sufficient amount of space within a device exhibiting full-duplex/half-duplex operating modes so as to not impose constraints on either the design of circuits and batteries therefor or the mechanical design thereof.

SUMMARY OF THE INVENTION

This invention addresses at least some of the deficiencies that prevail in the prior art described herein above. In accordance with a first aspect of the invention there is provided a radio communications device having means for operating in both a radio dispatch mode and a telephone interconnect mode, the communications device further comprising: an ear-piece for broadcasting, at least in the telephone interconnect mode, audio signals of at least a relatively low audio level; and means for providing audio signals of at least a relatively high audio level during at least the radio dispatch mode; wherein said means for providing audio signals of relatively high audio level is arranged to ensure that, at least during an initial period of operation in either of the two operating modes, audio signals of relatively high level do not originate from the ear-piece, thereby preventing a change in audio power output from the ear-piece that may potentially cause damage to the hearing of a user of the radio communications device.

In a preferred embodiment, the communications device comprises a handset containing an ear-piece arranged to be operable in at least the telephone interconnect mode and having a relatively low audio power output. The handset further comprises a microphone and a speaker. The speaker has a relatively high audio power output and is arranged to be operable in said dispatch mode. Furthermore, the speaker is substantially co-located with the microphone. Moreover, the ear-piece and speaker are located on the same side of the handset and, when in use, are located such as to be positioned adjacent to a user's ear and mouth respectively.

In the preferred embodiment, the dispatch mode may further define a default mode in which the user is alerted to a call directed at the communications device by the generation an audible call sign through the speaker. Moreover, the speaker is muted during operation of the communications device in the telephone interconnect mode. Furthermore, the communications device further comprises a first response key, whereby actuation of the first response key allows the user to respond to a dispatch call. In a similar manner, actuation of a second response key causes the communication device to enter the telephone interconnect mode. Additionally, actuation of the second response key causes the muting of the speaker and facilitates the response of the user to a telephone interconnect call. Actuation of a cancellation key causes the communications device to terminate operation in the telephone interconnect mode and resume operation in said default mode.

The communications device may further comprises a visual display unit. In addition, the microphone may be constructed with an acoustic wave guide, and the speaker has a typical audio power output of between 1 and 2 watts.

In an alternative embodiment, the communications device comprises: a microprocessor for the operational control of the radio communications device; a variable gain amplifier whose gain is responsive to the microprocessor; and an audio speaker whose output is responsive to the variable gain amplifier; wherein the microprocessor increases the gain of the variable amplifier over a period of time to produce a audible signal from the speaker that is ramped through a number of discrete audio output levels.

In the alternative embodiment, the microprocessor controls the gain of the variable gain amplifier by ramping the gain through a number of discrete gain settings between an initial gain setting, representing a relatively low audio output level, and an ultimate gain setting, representing a relatively high audio output level, and the radio communications device further comprises monitoring means for monitoring ambient noise, said monitoring means being coupled to the microprocessor, whereby the initial gain setting of the variable amplifier is altered with respect to the amount of ambient noise monitored.

The monitoring means may monitor the ambient noise approximately every $\sim 20$ milliseconds and the initial gain of the variable gain amplifier is subsequently adjusted by the microprocessor accordingly.

Furthermore the gain between adjacent gain settings is sufficiently small, e.g. $\sim 2$ dB, such as to prevent a change in audio power output from the audio speaker from causing potential damage to the hearing of a user of the radio communications device.

The period of time for ramping may be in the approximate range of $\sim 2$ seconds $\pm 30\%$. The time period between ramping from one gain setting to the next adjacent gain setting may be determined by the number of discrete audio output levels between the initial gain setting and the ultimate gain setting, with the time period being constant, and typically within the range of 0.1 seconds to 0.5 seconds.

The radio communications device may further comprise: a receiver, coupled to the microprocessor, for receiving radio signals having a message portion and a control word that defines an operating mode for the radio communications device; and tone generating means, responsive to the microprocessor and coupled to the variable gain amplifier, for locally generating a tone; wherein the form of the audible signal is determined by the microprocessor in response to the operating mode identified in the control word, such that: in the radio dispatch mode, the message portion is ramped; and in the telephone interconnect mode, the locally generated tone is ramped.

In addition, the radio communications device may further comprise: a second variable gain amplifier, coupled to both the audio speaker and the tone generating means, whose gain is responsive to the microprocessor; and a summation unit, coupled between said audio speaker and both variable gain amplifiers, for summing outputs generated from both of said variable gain amplifiers; wherein a telephone interconnect call can be announciated, independent of a current radio dispatch call, by ramping the locally generated tone, in response to the microprocessor, through a number of discrete audio output levels provided by the second variable gain amplifier.

Means may be provided to allow the termination of the ramping of the audible signal in the interconnect mode, and to ensure that ramping of the audible signal never exceeds the minimum audio level selected by a user of the radio communications device.

In another aspect of the present invention, there is provided a method of operating a radio communications device that is operable in both a radio dispatch mode and a telephone interconnect mode, comprising the steps of: receiving a radio signal containing a control word that defines an operating mode for the radio communications device; selecting an operating mode for the radio communications device in response to the control word; and generating and ramping, over a predetermined period of time, an audible signal from a speaker of the radio communications device, the form of the audible signal being determined by the operating mode identified by the control word.

Exemplary embodiments of the invention will now be described with reference to the accompanying drawings.

DETAILED DESCRIPTION OF A PREFERRED EMBODIMENT

Figure 1:
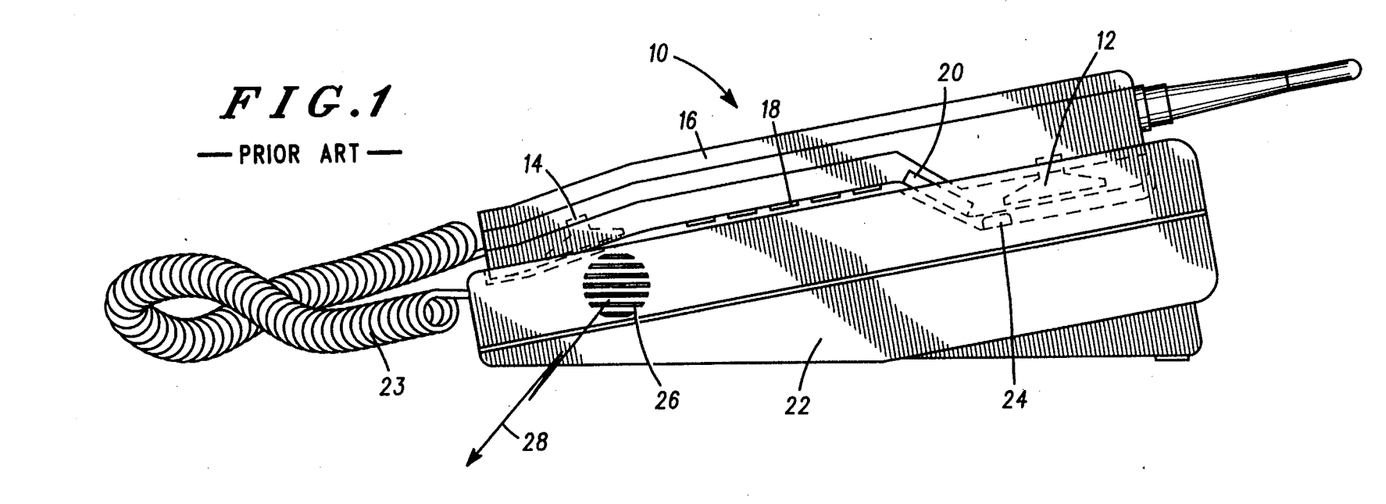
FIG. 1 illustrates a prior art radio telephone handset arrangement.

With reference to FIG. 1, there is shown a prior art portable full-duplex radio unit. Typically, the portable full-duplex unit has applications in digital, analog, trunking or cellular radio telephone interconnect systems. The portable full-duplex unit is packaged to enable a user to use the portable unit in a similar way to a conventional telephone handset. The portable full-duplex unit typically comprises an internal, built-in ear-piece 12 and a separate microphone 14. The ear piece 12 and microphone 14 are located such that when the portable unit is desired to be used as a telephone handset 16, the ear piece 12 is located in close proximity to a user's ear whilst the microphone 14 is located in close proximity to the user's mouth. A key board 18 and a display 20 for such a portable unit is located at either the front or back of the unit; the position determined from the viewpoint of design convenience. This configuration supports the operation of the portable unit in a full-duplex telephone type system.

When a portable unit is in a standby mode, and the portable unit is operating in a telephone type full-duplex system, the unit is typically held in either a specially designed holster or base unit 22 or in the hand of a user. In the instance when the portable unit resides in the base unit 22, such as when the portable unit is a transportable, the portable unit is temporarily coupled to the base unit 22 through a cable 23. A hook switch 24, located on the base unit 22 is depressed by the pressure of the unit thereon and, as a consequence thereof, activates a loud speaker 26 mounted on a side of the base unit. When a call is directed towards a particular unit, that portable unit attracts the attention of the user by issuing a call received tone 28 through the loud speaker 26. In response to such a tone 28, the user activates an answer button on the portable unit and then correctly orientates the portable unit towards their head in order to facilitate a telephone conversation. Furthermore, the release of the hook switch 22 de-activates the loud speaker 26 and enables the ear-piece 12. Alternatively, if a user initiates a call, the user dials the required number and then correctly orientates the unit such that the ear piece 12 is in close proximity to one of their ears. The user will then be able to identify when the call has been answered. It will be appreciated that during typical operation of a full-duplex telephone system, a received message is usually routed to an ear piece so as to ensure adequate acoustic reception by the human ear at a sufficiently low sound pressure. If the portable unit is hand held, announciation of an incoming call is made through the ear piece 12.

Figure 2:
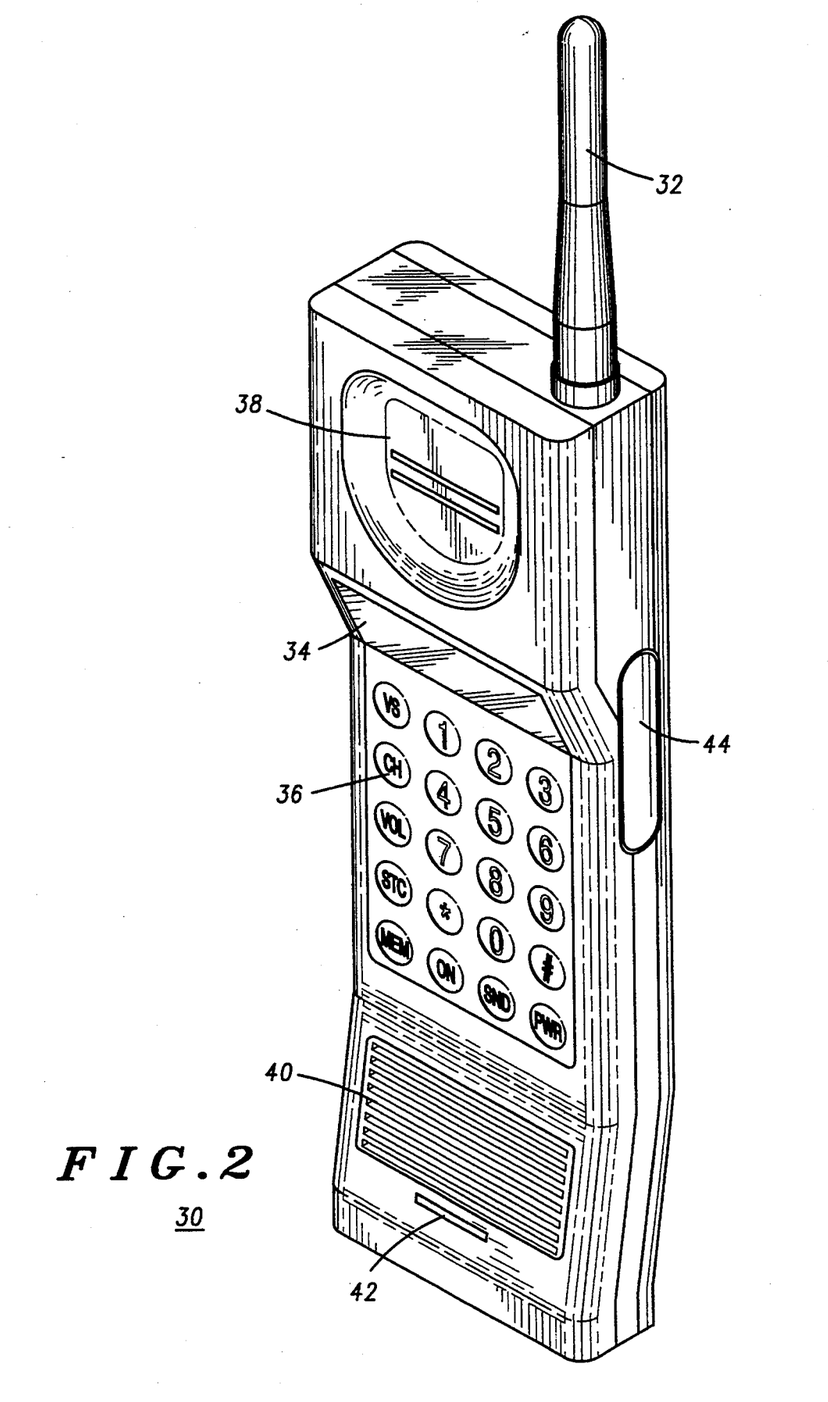
FIG. 2 illustrates a preferred embodiment of a combined radio dispatch and telephone interconnect radio in accordance with the present invention.

With reference to FIG. 2, a preferred embodiment of a full duplex/half duplex radio telephone 30, configured to support dispatch, trunking and interconnect communication therein, is shown. The radio telephone 30 comprises a unit configured in the shape of a conventional telephone or radio telephone handset, such as Fieldman TM transportable radios, manufactured by Motorola Inc. [Fieldman TM is a trade mark of Motorola, Inc.]. An antenna 32, a display 34 for displaying user information and a keypad 36, incorporating "send" and "answer" buttons, are configured on the handset 30 in accordance with techniques obvious to those skilled in the art. An ear-piece 38 is mounted at an upper end of the handset and in close proximity to the antenna 32. A relatively high audio power speaker 40, typically ~1-2 watts power output, is located at a lower end of the handset and on the same side as the ear-piece 38. A transducer 42, such as a microphone, is mounted close to the speaker 42 such that, when in operation, the transducer 42 and speaker 40 face the mouth of a user. It will be appreciated that the transducer may be constructed with or without an acoustic guide and that the transducer may be of the capsule variety. The radio telephone 30 further comprises a push to talk (PTT) button 44 located on the side of the handset.

The novel configuration described above ensures that a user can operate the radio telephone 30 with the ear-piece 38 in close contact with their ear whilst receiving a dispatch call. The position of the relatively high power speaker 30 is near the mouth and, therefore, a safe distance from both ears. Not only does this position avoid possible damage to the hearing of a user, it also represents a desirable attribute in that it mimics a common operating position for a half duplex dispatch radio i.e. the unit is in close proximity to a user mouth during conversation.

When the radio telephone 30 is held in the hand or located in a holster, a dispatch or radio interconnect call signal is broadcast loudly through the speaker 40. In the dispatch mode, a user may chose to respond to a particular dispatch call, identified by either a received name or call-sign, by depressing the PTT button 44, orienting the handset accordingly and operating the radio telephone 30 in accordance with known radio dispatch procedures. Alternatively, if a telephone interconnect call is received, a user will respond by pressing the "answer" button, thereby disabling the speaker 40 but retaining the use of the ear-piece 38, and orienting the radio telephone 30 accordingly. If a user intends to place a call in the interconnect mode, the user dials a number on the keypad 36 and then activates the "send" button, whereby the radio telephone 30 registers that it is in the interconnect mode and therefore disables the speaker 40. When a telephone interconnect call is terminated, the radio telephone 30 returns to a default mode, characterised in that the default mode is also the dispatch mode. Clearly, with the default mode being the dispatch mode, all received calls will be audible. Moreover, the distinct procedural steps involved in operating the radio telephone 30 in the dispatch and interconnect modes, ensures that a user should not sustain hearing damage caused by the relatively high audio power speaker 40.

DETAILED DESCRIPTION OF AN ALTERNATIVE EMBODIMENT

Figure 3:
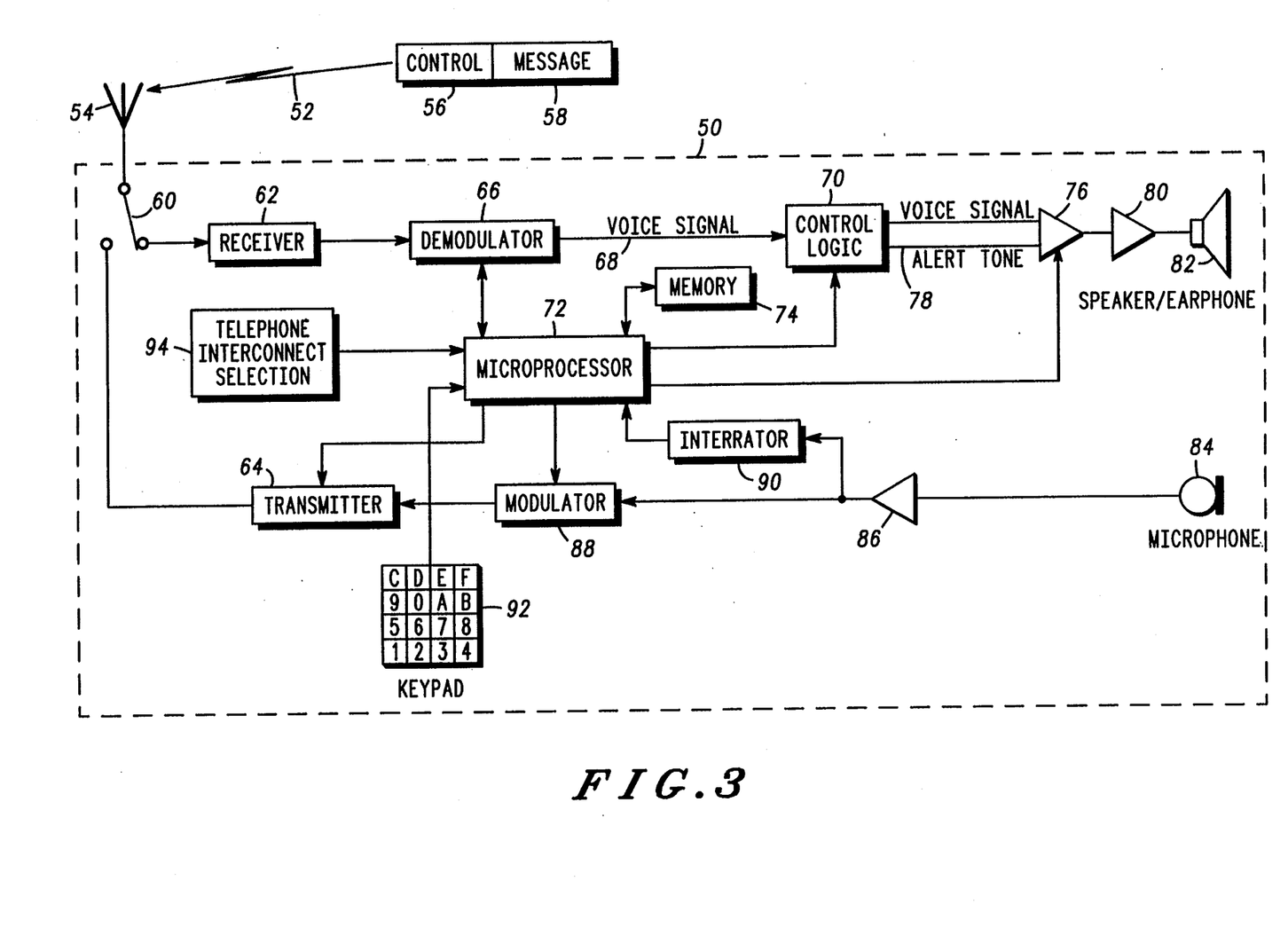
FIG. 3 shows a schematic diagram of a combined radio dispatch and telephone interconnect radio in accordance with a further aspect of the present invention.

With reference to FIG. 3, there is shown an alternative embodiment of the present invention. A radio communications device 50, suitable for operation in a radio dispatch mode or a telephone interconnect mode, receives radio frequency signals 52 through an antenna 54. The radio frequency signals typically comprise an envelope of information made up from a control word 56 and a message portion 58. The control word may, for example, contain control information for the radio, such as an indication of received strength or the type of communication system, i.e. dispatch or interconnect, currently being employed. The message portion 58 may be encoded voice data, for example. It will be appreciated that the radio communication device may be a cellular radio or an analog radio and may operate with a full-duplex or half-duplex methodology, for example.

The antenna 54 is selectively coupled, through an antenna switch 60, to either a receiver 62 or a transmitter 64 of the radio communications device 50. The receiver 62 is coupled to a demodulator 66 that demodulates the received radio frequency signals 52. From the envelope of radio frequency signals 52, the demodulator 66 provides a voice signal 68 to a control logic section 70, and control information, i.e. the control word 56, to a microprocessor 72. As will be appreciated, the microprocessor 72 controls the operation of the radio communications device 50 in response to either the control information or external data input provided by a user of the communications device. More particularly, the microprocessor administers control of the control logic section 70. Typically, the microprocessor 72 will be coupled to memory 74, such as an E$^2$PROM.

The control logic section 70 communicates the voice signal to a variable gain amplifier 76. In addition, an alert tone 78, provided through an output of the control logic section 70 in response to the identification of a telephone interconnect call by the microprocessor 72, is coupled to a second input of the variable gain amplifier 76. The gain of the variable gain amplifier 76 is further controlled by the microprocessor 72. An output from the variable gain amplifier 76 is coupled through a power amplifier 80 to a speaker or earphone 82 capable of generating both relative low and relatively high audio output levels. The power amplifier 80 is required to boost the strength of any voice signal, for example, output from the variable gain amplifier 76 to a level sufficient to drive the speaker or earphone 82.

A microphone 84 is coupled through an amplifier 86 to a modulator circuit 88. The modulator 88 is responsive to the microprocessor 72 and modulates a message to be transmitted from the communications device 50 into a format suitable for transmission through transmitter 64. An output from amplifier 86 is communicated through an integrator 90 to the microprocessor 72. A keypad 92 and a telephone interconnect selection button 94 are coupled to the microprocessor 72, and provide a form of user input into the radio communications device 50.

Operation of the radio communications device of the alternative embodiment will now be described. A received radio frequency signal 52 is demodulated in demodulator 66, with the control word portion 56 being interpreted by the microprocessor 72. The control word portion 56 determines a current operating mode for the communications device, i.e. whether the communications device is to operate a telephone interconnect mode or a radio dispatch mode. The message portion 58 of the radio frequency signal 52 is demodulated by demodulator 66 and transmitted as a voice signal 68 through logic circuits 70. Upon initially receiving either a radio dispatch call or a telephone interconnect call, announciation of the particular call is achieved through audio ramping of either the voice signal (in the dispatch mode) or an alert tone 78 (in the telephone interconnect mode) generated by a tone generator (not shown). More specifically, the microprocessor 72 determines the particular operating mode and then systematically adjust the gain of variable gain amplifier 76 from an initial gain, through a number of discrete gain settings, to an ultimate gain therefor. This stepped function in the gain control of the variable gain amplifier 76 produces, through the speaker or earphone 82, an audio signal of increasing and stepped magnitude. Typically, the increase in gain between adjacent discrete gain settings in the variable gain amplifier 76 is ~2 dB. Basically, the difference in adjacent gain settings must be sufficiently small to prevent a change in audio power output from the audio speaker or earphone 82 from causing potential damage to the hearing of a user of the radio communications device when the speaker or earphone 82 is in close proximity to the user's ear. Furthermore, it has been found experimentally that the duration of time required to ramp the acoustic output from the speaker or earphone 82 up to its maximum level, i.e. the total ramp time required to attain the ultimate gain level from an initial gain level of the variable gain amplifier, should be ~2 seconds ±30%. This ensures that, in a dispatch mode, a first portion of the dispatch message is not lost to a user of the communications device.

Since the ultimate acoustic output from the speaker or earphone 82 is dependent upon the ultimate gain of the variable gain amplifier 76, a user of the communications device 50 may input a desired level for this ultimate acoustic output by using, for example, the keypad 92. In such a case, the required ultimate gain is stored in memory 74. Additionally, since the variable gain amplifier 76 ramps the voice signal, for example in the dispatch mode, from an initial gain to the ultimate gain for the variable gain amplifier, the ultimate gain must exceed the initial gain if ramping of the signal is to occur, otherwise the voice signal will simply be communicated to the speaker or ear phone 82, through the power amplifier 80, at the level selected by the user.

It will be appreciated that the keypad 92 may equally well be replaced by a standard rotary potentiometer, with its preferred ergonomic features.

Figure 5:
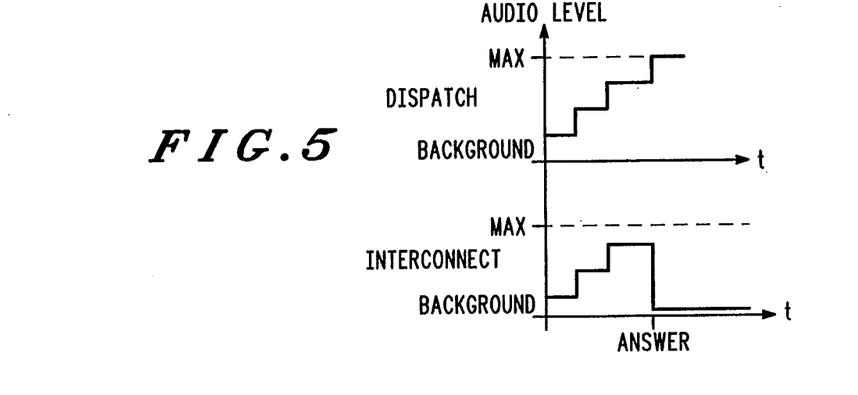
FIGS. 5-7 show alternative audio output ramping profiles for the combined radio dispatch and telephone interconnect radios of FIGS. 3 and 4.

As has previously been described, the microprocessor 72 is also responsive to an input from a telephone interconnect selection button 94. In the event that a user wishes to respond to an telephone interconnect call during ramping of the alert tone, or afterwards, depression of the telephone interconnect selection button 94 will terminate the ramping, for example, and initiate voice communication, in the telephone interconnect mode, at an audio level substantially lower than that used to announciate the presence of the telephone interconnect call (see FIG. 5).

In the preferred embodiment, a user of the radio communications device 50 may select from 16 levels of volume control, with levels 5–11 representing settings for the initial gain. Therefore, the time period T between ramping from one gain setting to the next adjacent gain setting is determined by the number of discrete audio output levels between the initial gain setting and the ultimate gain setting, i.e. the total ramp time (2 seconds ±30%) divided by the number of discrete steps between the ultimate and initial gains $$\left( T = \frac{2}{\text{Steps (Gain}_{Ult} - \text{Gain}_{Init})} \right).$$

Figure 6:
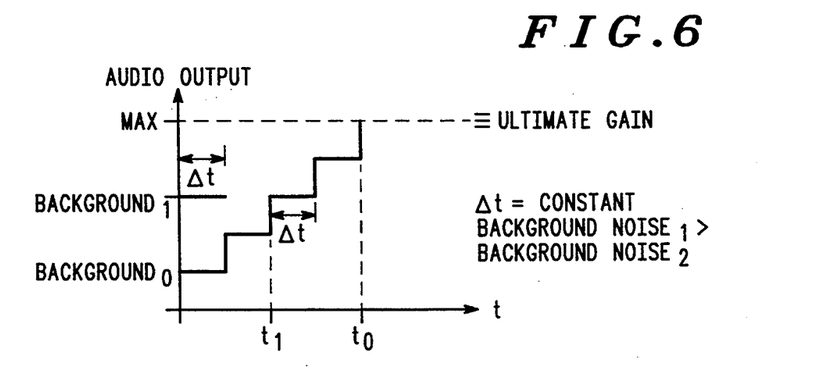
Figure 7:
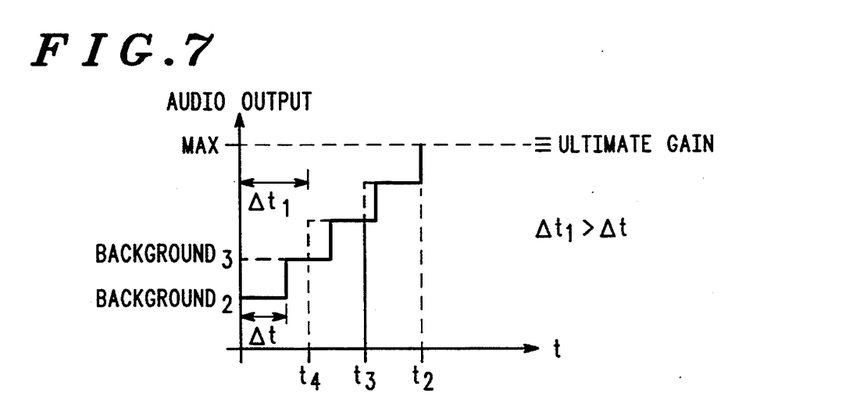

In this instance, the duration at each discrete gain setting, although constant, varies according to the number of available gain settings between the ultimate and initial gain settings. However, it may be desirable to produce a ramp function that has a constant step duration, irrespective of the number of available settings between the ultimate and initial gains. By way of example, if there were five discrete levels (settings) between the ultimate gain and the initial gain and the total ramping time was two seconds, each successive volume (audio output) level would be generated for 0.5 seconds, but if there were 8 discrete levels then this duration would be reduced by a factor of 2. Alternatively, since a period of ~0.13 seconds for each transition may be sufficient in certain circumstance (2 seconds minus 30%, with 11 gain settings between the initial and ultimate gains), ramping may be achieved more quickly, e.g. 7 levels (gain settings) at a constant duration of 0.13 represents a total ramping period of ~1 second. The concept of having step durations that may vary according to either the number of available gain settings, the total ramp time or both the number of settings and the total ramp time can best be illustrated with reference to FIGS. 6 and 7 of the accompanying drawings.

It will be appreciated that the human ear adapts to current ambient noise surroundings in as much as ambient noise is, to some extent, filtered out. However, it is the magnitude of the change in audio power output from the ear-piece or speaker 82 that may potentially cause damage to the hearing of a user of the radio communications device. The "automatic gain control" of the human ear is the factor which determines whether the noise is relatively high and likely to cause damage. If a person is in a generally noisy environment, they are still likely to suffer damage to their hearing if the relative increase of the audio broadcast is sufficiently large. Therefore, the change in audio output levels between adjacent settings is selected to avoid such a dramatic and potentially harmful increase, i.e. ~2 dB.

It will be further appreciated that there is a particular requirement to ensure that the announciation of a message is received promptly, this being particularly important for radio dispatch messages where the announciation, in fact, forms part of the message. To this extent, the microphone 84 of the radio communications device 50 constantly monitors background (ambient) noise. Monitoring of the ambient background noise is performed whilst the radio is operating in, typically, a stand-by mode and in this way allows the radio communications device 50 to adapt to any excesses in background noise that are likely to interfere with reception by the user. Typically, software run by the microprocessor is arranged to sample the background noise, through the microphone 84, at regular time intervals; this being once every ~23 milliseconds in the preferred embodiment. The sampled ambient noise is communicated to the microprocessor 72 through the integrator circuit 90, as will be appreciated. In response to the sampled ambient noise, the microprocessor 72 determines (adapts) an initial gain setting sufficient to overcome the background noise, whereby the adaptation of the initial gain ensures that any announciation of an incoming telephone interconnect or radio dispatch call will be suitably communicated to a user of the communications device, irrespective of ambient noise levels. In the preferred embodiment, the initial gain of the variable gain amplifier 76 is determined in accordance with the table below.

| Noise Level | Initial Gain (Volume Level) |
| --- | --- |
| Level 1 (Maximum Noise Compensation) | Volume 11 |
| Level 2 | Volume 9 |
| Level 3 | Volume 7 |
| Level 4 (Minimum Noise Compensation) | Volume 5 |

Clearly, the number of noise levels, volume levels and the staring volume level for the initial gain can each be varied according to requirements. The table and description provided is only representative and should not be considered to be exhaustive.

As has been indicated, all the above monitoring and ramping algorithms will be implemented only if the operator has selected a volume level in excess of level 4, i.e. the minimum level at which ramping starts. Furthermore, to this extent, if a user selects, say, a maximum volume level of 9, ramping of any announciation will be restricted to a maximum gain associated with this audio output. In the current embodiment, any level below volume level 5 is weak and would therefore not present any possibility of damage to the hearing of a user.

By way of example, if we consider the instance when the ambient noise level is identified as level 4, i.e. there is minimal extraneous noise, and the user selects the volume level for the ultimate gain to be volume 16, i.e. maximum volume, then the ultimate gain is set to the gain required for volume 16. According to the table, the initial gain will be volume 5 so the number of steps will be equal to the number of discrete gain settings between the ultimate gain and initial gain (16–5), i.e. 11. Therefore, the period between successive discrete gain settings is 2 divided by 11 seconds. In a further example if we consider the case when ambient noise is at a maximum, i.e. that the microprocessor has selected an initial gain equivalent to volume 11, there are only five steps/settings between the ultimate gain and the initial gain, with the period between transitions in adjacent gain settings increased to 2 divided by 5 seconds.

Figure 4:
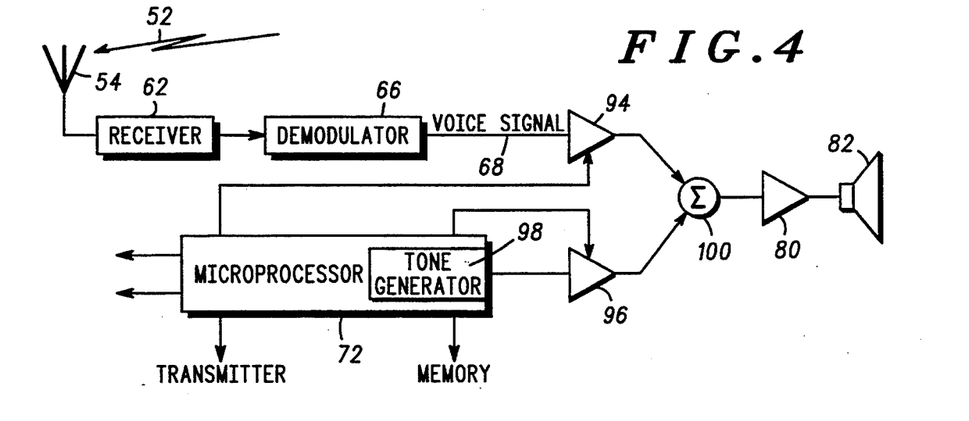
FIG. 4 shows a further refinement of the combined radio dispatch and telephone interconnect radio of FIG. 3.

With reference to FIG. 4, there is shown a further refinement of the circuit of FIG. 3. In this case, the control logic circuitry 70 has been replaced by a combination of two variable gain amplifier circuits. More specifically, the voice signal 68 is coupled through a first variable gain amplifier 94, responsive to the microprocessor 72. A second variable gain amplifier 96 is coupled between a tone generator 98, located with the microprocessor 72, and a summation circuit 100. The tone generator 98 is required to for the announciation of a telephone interconnect call. An output from the first variable gain amplifier 94 is also coupled to the summation circuit 100. An output from the summation circuit is coupled through the power amplifier 80 to the speaker or earphone 82. The gain of both variable gain amplifiers 94 and 96 is responsive to control from the microprocessor 72 in accordance with the aforedescribed methodology. This new configuration allows a telephone interconnect call to be independently announciated from the speaker or ear phone 82, irrespective of whether there is a current radio dispatch call in progress. Again, control of the gain of the variable gain amplifiers ramps the announciation, i.e. the voice signal in a dispatch mode or the locally generated tone in the telephone interconnect mode, through a number of discrete gain settings.

It will be appreciated that the tone generator 98 may be additionally used to alert tone a user that the communications device 50 is suffering from a low battery condition. Furthermore it will be appreciated that this tone need not be ramped, although it may be desirable to ramp the alert.

In summary upon receipt of either a dispatch call or a telephone interconnect call the radio communications device initially ramps a tone in the telephone interconnect mode, or a voice message in a dispatch mode. A control word received in the radio frequency signals instructs the microprocessor 72 to either open the audio path (in the dispatch mode) and therefore broadcast speech, or to produce a locally generated ringing tone from the tone generator circuit. If in the case of the telephone interconnect call, if a user actuates the telephone interconnect selection button 94 the ramping (or maximum audio output) will cease and the output from the speaker earphone 82 will be reduced to a level sufficiently for telephone interconnect purposes.

It can be appreciated that an invention designed and described in accordance with either embodiment of the present invention provides a communications device capable of supporting dispatch, trunking and interconnect communication therein, whilst inhibiting undesirable and potentially hazardous conditions associated with audio output levels from each of the distinct operating modes. Moreover, the device is configured such that the different acoustic and operational requirements for radio dispatch and radio telephone interconnect methodologies are satisfied. In either case, the problem associated with the generation of a sudden relatively high level noise compared with a present ambient noise has been mitigated.

We claim:

1. A radio communications device having means for simultaneously operating in both a radio dispatch mode and a telephone interconnect mode, the communications device further comprising:
    a) an ear-piece for broadcasting, at least in the telephone interconnect mode, audio signals of at least a relatively low audio level;
    b) means for providing audio signals of at least a relatively high audio level during at least the radio dispatch mode, wherein said relatively low audio level is less than said relatively high audio level;
    c) a microphone:
    d) a speaker, having a relatively high audio power output, arranged to be operable in said dispatch mode and substantially co-located with said microphone; and
    wherein said means for providing audio signals of relatively high audio level is arranged to ensure that, at least during an initial period of operation in either of the two operating telephone interconnect mode or radio dispatch mode, audio signals of relatively high audio level do not originate from the ear-piece, thereby preventing a change in audio level output from the ear-piece that can cause damage to the hearing of a user of the radio communications device.

2. The radio communications device of claim 1, wherein the dispatch mode further defines a default mode in which the user is alerted to a call directed at the communications device by the generation of an audible call sign through the speaker.

3. The radio communications device of claim 2, further comprising means for muting the speaker wherein said means for muting mutes the speaker during operation of the communications device in the telephone interconnect mode.

4. The radio communications device of claim 3, wherein the communications device further comprises a first response key, whereby actuation of the first response key allows the user to respond to a dispatch call.

5. The radio communications device of claim 3, wherein the communications device further comprises a second response key, whereby actuation of the second response key:
    i) causes the communication device to enter the telephone interconnect mode; and
    ii) causes said means for muting to mute the speaker; thereby allowing the user to respond to a telephone interconnect call.

6. The radio communications device of claim 5, wherein the communications device further comprises a cancellation key, wherein actuation of said cancellation key causes the communications device to terminate operation in the telephone interconnect mode and resume operation in said default mode.

7. The radio communications device of claim 6, wherein the microphone is constructed with an acoustic wave guide.

8. The radio communications device of claims 1, wherein the speaker has an audio output power of between 1 to 2 watts.

9. The radio communications device of claim 1, wherein the communications device is one of either a cellular radio telephone and a portable radio.

10. The radio communications device of claim 1, wherein the communications device further comprises a visual display unit.

11. A method of operating a communications device, simultaneously operable in a radio dispatch mode and a telephone interconnect mode, comprising a handset containing an ear-piece arranged to be operable in at least the telephone interconnect mode and having a relatively low audio power output, a microphone and a speaker, having a relatively high audio power output, arranged to be operable in said dispatch mode and substantially co-located with said microphone; wherein said relatively low audio power output is less than said relatively high audio power output and further wherein the ear-piece and speaker are located on the same side of the handset and, when in use, are located such as to be positioned adjacent to a user's ear and mouth respectively; the method comprising the steps of;
    a) operating the device in the dispatch mode;
    b) alerting a user that a call has been directed at the communications device by generating an audible call sign through said speaker;
    c) responding to said audible call sign by selecting a relevant operating mode from either said dispatch mode or said telephone interconnect mode, whereby the selection of the relevant operating mode is dependent upon whether the call sign was generated in response to a dispatch or telephone interconnect message;

d) muting the speaker when the telephone interconnect mode has been selected; and e) relaying the message through at least the ear-piece.

12. The method of operating a communications device in accordance with claim 11, wherein the device further comprises a telephone interconnect response key, and the step of selecting includes:

actuation of the telephone interconnect response key causes:

a) the communication device to enter the telephone interconnect mode; and b) said muting of the speaker to occur;

thereby allowing the user to respond to a telephone interconnect call.

13. The method of operating a communications device in accordance with claim 11, wherein the communications device further comprises a cancellation key, and the method further comprises the step of:

a) terminating operation in said telephone interconnect mode by actuating said cancellation key, whereby the communications device resumes operation in said dispatch mode.

14. The method of operating a communications device in accordance with claim 11, wherein the communications device further comprising a dispatch mode response key, and the step of selecting includes:

a) actuation of the dispatch mode response key allows the user to respond to a dispatch message;

and the step of relaying a dispatch message is characterized in that:

b) the dispatch message is relayed through at least the speaker.

15. A radio communications device as claimed in claim 1, the communications device comprising:

a) a microprocessor for the operational control of the radio communications device;

b) a variable gain amplifier whose gain is responsive to the microprocessor; and c) an audio speaker, for producing an audio signal, having an output signal responsive to the variable gain amplifier;

wherein the microprocessor increases the gain of the variable amplifier over a period of time to produce an audible signal from the speaker that is ramped through a number of discrete audio output levels.

16. A radio communications device as claimed in claim 15, wherein the microprocessor controls the gain of the variable gain amplifier by ramping the gain through a number of discrete gain settings between an initial gain setting, representing a relatively low audio output level, and an ultimate gain setting, representing a relatively high audio output level, and the radio communications device further comprises monitoring means for monitoring ambient noise, said monitoring means being coupled to the microprocessor, whereby the initial gain setting of the variable amplifier is altered with respect to the amount of ambient noise monitored.

17. A radio communications device as claimed in claim 16, wherein the monitoring means monitors the ambient noise approximately every 20 milliseconds and the initial gain of the variable gain amplifier is adjusted by the microprocessor accordingly.

18. A radio communications device as claimed in claim 15, wherein the gain between adjacent gain settings is sufficiently small such as to prevent a change in audio power output from the audio speaker from causing damage to the hearing of a user of the radio communications device.

19. A radio communications device as claim in claim 16, wherein the gain between adjacent gain settings is sufficiently small such as to prevent a change in audio power output from the audio speaker from causing damage to the hearing of a user of the radio communications device.

20. A radio communications device as claimed in claim 18, wherein the gain between adjacent gain settings is approximately 2 dB.

21. A radio communications device as claimed in claim 16, wherein the period of time for ramping is approximately within the range of approximately 2 seconds ±30%.

22. A radio communications device as claimed in claim 16, wherein a time period between ramping from one gain setting to the next adjacent gain setting is determined by the number of discrete audio output levels between the initial gain setting and the ultimate gain setting.

23. A radio communications device as claimed in claim 16, wherein a time period between ramping from one gain setting to the next adjacent gain setting is constant.

24. A radio communications device as claimed in claim 23, wherein the constant time period is within the approximate range of 0.1 seconds to 0.5 seconds.

25. A radio communications device as claimed in claim 15, further comprising:

a) a receiver, coupled to the microprocessor, for receiving radio signals having a message portion and a control word that defines an operating mode for the radio communications device; and b) tone generating means, responsive to the microprocessor and coupled to the variable gain amplifier, for locally generating a tone;

wherein the form of the audible signal is determined by the microprocessor in response to the operating mode identified in the control word, such that:

in the radio dispatch mode, the message portion is ramped; and in the telephone interconnect mode, the locally generated tone is ramped.

26. A radio communications device as claimed in claim 25, further comprising:

a) a second variable gain amplifier, coupled to both the audio speaker and the tone generating means, whose gain is responsive to the microprocessor; and b) a summation unit, coupled between said audio speaker and both variable gain amplifiers, for summing outputs generated from both of said variable gain amplifiers;

wherein a telephone interconnect call can be annunciated, independent of a current radio dispatch call, by ramping the locally generated tone, in response to the microprocessor, through a number of discrete audio output levels provided by the second variable gain amplifier.

27. A radio communications device as claimed in claim 15, further comprising means for terminating the ramping of the audible signal in the interconnect mode.

28. A radio communications device as claimed in claim 15, further comprising means, coupled to the microprocessor, for selecting a minimum audio level, wherein ramping of the audible signal never exceeds the minimum audio level selected by a user of the radio communications device.

29. The radio communications device of claim 15, wherein the communications device is one of either a cellular radio telephone or a portable radio.

30. A method of operating a radio communications device that is operable in both a radio dispatch mode and a telephone interconnect mode, comprising the steps of:
   a) receiving a radio signal containing a control word that defines an operating mode for the radio communications device;
   b) selecting an operating mode for the radio communications device in response to the control word; and
   c) generating and ramping, over a predetermined period of time, an audible signal from a speaker of the radio communications device, the form of the audible signal being determined by the operating mode identified by the control word.

31. A radio communications device having means for simultaneously operating in both a radio dispatch mode and a telephone interconnect mode, the communications device further comprising:
   a) a transducer for broadcasting, in at least the radio dispatch mode, audio signals of at least a relatively high audio level;
   b) means for providing audio signals of at least a relatively low audio level in at least the telephone interconnect mode;
   c) a) an ear-piece arranged to be operable in at least the telephone interconnect mode and having a relatively low audio power output:
   d) a microphone:
   e) a speaker having a substantially high audio power output arranged be operable in said dispatch mode and substantially co-located with said microphone; and
   wherein the ear-piece and speaker are located on the same side of the first, surface of the handset and, when in use, are located such as to be positioned adjacent to a user's ear and mouth respectively, and further wherein said relatively high audio level is greater than said relatively low audio level and said means for providing audio signals of relatively high audio level is arranged to ensure that, at least during an initial period of operation in either of said radio dispatch mode or said telephone interconnect mode, audio signals of relatively high level do not originate for the transducer, thereby preventing a change in audio output level from the transducer that can cause damage to the hearing of a user of the radio communications device.

32. The radio communications device of claim 31, wherein the dispatch mode further defines a default mode in which the user is alerted to a call directed at the communications device by the generation of an audible call sign through the speaker.

33. The radio communications device of claim 32, further comprising means for muting the speaker wherein said means for muting mutes the speaker during operation of the communications device in the telephone interconnect mode.

34. The radio communications device of claim 33, wherein the communications device further comprises a first response key, whereby actuation of the first response key allows the user to respond to a dispatch call.

35. The radio communications device of claim 34, wherein the communications device further comprises a second response key, whereby actuation of the second response key:
   i) causes the communication device to enter the telephone interconnect mode; and
   ii) causes said means for muting to mute the speaker; thereby allowing the user to respond to a telephone interconnect call.

36. The radio communications device of claim 35, wherein the communications device further comprises a cancellation key, wherein actuation of said cancellation key causes the communications device to terminate operation in the telephone interconnect mode and resume operation in said default mode.

37. The radio communications device of claim 36, wherein the microphone is constructed with an acoustic wave guide.

38. The radio communications device of claim 31, whereto the speaker has an audio output power of between 1 to 2 watts.

39. The radio communications device of claim 31, wherein the communications device is one of either a cellular radio telephone and a transportable.

40. The radio communications device of claim 31, wherein the communications device further comprises a visual display unit.

41. A radio communications device having means for simultaneously operating in both a radio dispatch mode and a telephone interconnect mode, the communications device further comprising:
   a) a transducer for broadcasting, in at least the radio dispatch mode, audio signals of at least a relatively high audio level;
   b) means for providing audio signals of at least a relatively low audio level in at least the telephone interconnect mode;
   c) an audio gain element for selecting the level of audio signals output from the transducer;
   d) a control element for selective audio ramping, dependent on the mode of operation, of the level of audio signal in at least an initial period of the dispatch mode of operation from the relatively low audio level to the relatively high audio level; and
   wherein said relatively high audio level is greater than said relatively low audio level.

42. The radio communications device of claim 41, wherein the dispatch mode further defines a default mode in which the user is alerted to a call directed at the communications device by the generation of an audible call sign through the transducer.

43. The radio communications device of claim 42, further comprising means for muting the transducer wherein said means for muting mutes the transducer during operation of the communications device in the telephone interconnect mode.

44. The radio communications device of claim 43, wherein the communications device further comprises a first response key, whereby actuation of the first response key allows the user to respond to a dispatch call.

45. The radio communications device of claim 44, wherein the communications device further comprises a second response key, whereby actuation of the second response key:
   i) causes the communication device to enter the telephone interconnect mode; and ii) causes said means for muting to mute the transducer; thereby allowing the user to respond to a telephone interconnect call.

46. The radio communications device of claim 45, wherein the communications device further comprises a cancellation key, wherein actuation of said cancellation key causes the communications device to terminate operation in the telephone interconnect mode and resume operation in said default mode.

47. The radio communications device of claim 41, wherein the communications device is one of either s cellular radio telephone and a transportable.

* * * * *